INVENTORS
GEORGE J. LAURER
CARL D. SOUTHARD
BY William N. Barret Jr.
ATTORNEY

May 11, 1965 G. J. LAURER ETAL 3,183,489

DATA TRANSFER DEVICE

Filed April 6, 1960 7 Sheets-Sheet 4

May 11, 1965 G. J. LAURER ETAL 3,183,489

DATA TRANSFER DEVICE

Filed April 6, 1960 7 Sheets-Sheet 5

3,183,489

DATA TRANSFER DEVICE

George J. Laurer, Johnson City, and Carl D. Southard, Endwell, N.Y., assignors to International Business Machines Corporation, New York, N.Y., a corporation of New York Filed Apr. 6, 1960, Ser. No. 20,438
4 Claims. (Cl. 340—172.5)

The present invention relates to a data output from a data processing machine and in particular to a digital output from a rotating storage drum to an output facility in which each digit position of the drum is assigned a predetermined spatial location.

In past-known machines, the output of digital data from a rotating magnetic drum has been connected to a printer or punch digit position by a timing matrix which relates a particular position on the magnetic drum with the spatial position of the printer or punch means. For each digit position of the drum, a coordinate location was necessary so that the size of the timing matrix would determine the maximum number of digit positions to be read from the drum.

In particular, the present invention is an improvement over that apparatus shown in Patent 2,798,544 to C. B. Smith. In that patent apparatus is shown to read from a card to a rotating magnetic drum and punch holes in a card in accordance with data stored on the drum. In order to relate the characters stored on a drum at selected locations, rotating at for example 12,500 r.p.m., to a fixed position, the patent teaches the use of a punch matrix. In this type of arrangement, a thyratron gate is provided for each character position on the drum. As each character position is sensed, outputs, indicative of each character position on the drum, are utilized with an indication that a particular data character is present in that position to cause conduction in a particular thyratron. Individual punch magnets may be connected to individual thyratrons.

The card to be punched is divided into twelve rows, 12, 11, 0, 1, 2 . . . 9. Characters are marked in the card by a hole or holes in a particular column of which there may be, for example, 80. The system of marking characters for a column is: for numeric, a hole is made in a row 0–9; for an alphabetic A, B, C, etc., a combination of two punches is made 12/1, 12/2, etc., 11/1, 11/2, etc., 0/2, 0/3, etc.; while a special character $, #, etc., is marked, for example, 2/8, 4/8, etc.

Each row of the card as it moves through the punching station may have a hole placed in a particular column depending upon whether the character position related to that column has a character which requires a hole to be made in that row. To establish this fact requires that the data being sensed in successive character positions on the drum be compared with data representative of that row. If a 9 row is being punched, a signal will be generated from a compare circuit each time a "9" is sensed by the sensing heads of the drum and in time with the word and digit signals as discussed previously. By combining the signal from the compare circuit indicative of a data signal to be recorded and the time signals, the related thyratron in the punch matrix is fired and the punch connected to that thyratron operated to put a hole in that row and column of the card.

In the convention of recording on the drum used in the patent and in the present invention, a word of ten digits plus sign could be used to indicate ten digits of numeric data or five digits of alphanumeric data. This is because if the data is mixed, i.e., alphanumeric, e.g., alphabetic and/or special characters and/or numeric, the code for each character occupies two successive character positions. Thus an "A" might be 61; a "K," 72; a "T," 83; a "1" might be 91; a "2" might be 92; while "#" might be 48.

On the other hand, straight numeric can be indicated in one character position as 0–9 if it is known that there are no other types of characters to be detected.

With the punch matric of the patent, there is one thyratron for each word and digit time. Thus to increase the capacity of the output necessitates additional thyratrons for each digit position on the drum.

In the present invention, the digits of data from the drum are related to the spatial position of the printing or punching digit positions by gating the digit output from the drum to each successive position in response to the timed selection of data from selected words on the drum. This provides great flexibility since the printer-punch digit position is related to the digit positions of the drum by means of the number of digit positions actually selected from the drum. Since the printer-punch digit positions are synchronized with readout of digit positions of the drum, the inflexible arrangement of providing a scan matrix large enough to provide for all possible digit positions of the output buffer is avoided.

A further feature of the present invention is the control word scan by which a word or words stored in the output buffer of the magnetic drum may be used to effect control for each of a plurality of groups of the printer-punch digit positions.

It is therefore an object of the present invention to provide an improved data transfer device.

It is a further object of the present invention to provide an improved data transfer device for transferring information from a rotating storage drum to a plurality of indicating means.

Another object of the present invention is to provide a data output device for a rotating data storage member to a plurality of printer-punch positions in which the printer-punch positions for the digits of each word of data from the storage member are determined successively for each word of data from the member.

A further object of the present invention is to provide a data output device for a rotating drum storage in which any number of words of data of the data storage device may be related to a fixed number of indicating positions of an output facility.

Yet another object of the present invention is to provide an apparatus for providing a format control for each of a plurality of groups of indicating positions of an output facility.

The foregoing and other objects, features and advantages of the invention will be apparent from the following more particular description of a preferred embodiment of the invention, as illustrated in the accompanying drawings.

In the drawings:

FIG. 1 is a schematic illustration of the invention.

FIGS. 2*a*, 2*b*, 2*c*, and 2*d* is a circuit diagram of a portion of the present invention.

Figure 1:
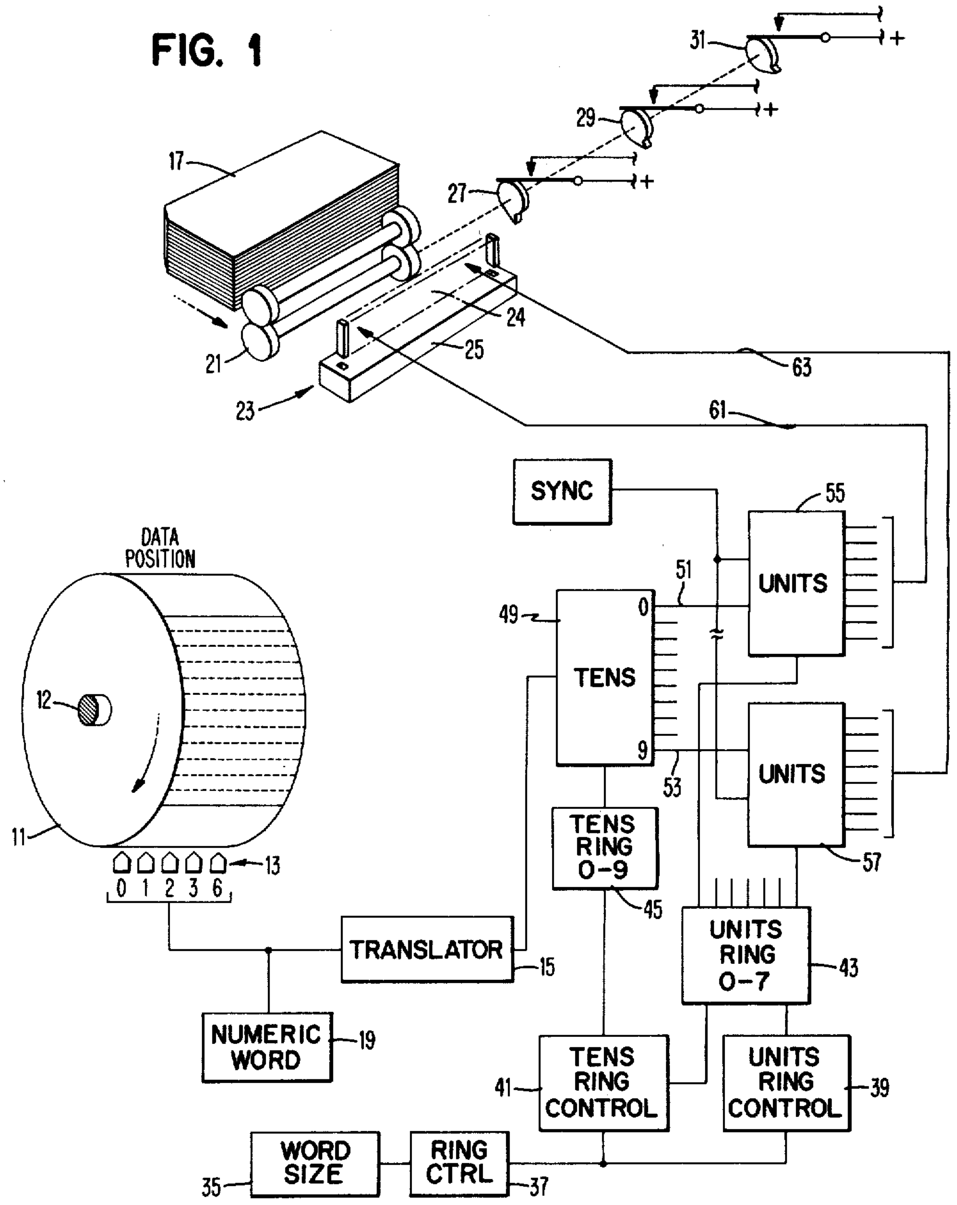

As shown in FIG. 1, magnetic drum 11 is rotatable on a shaft 12 and serially presents each digit position about the periphery to a series of reading-writing heads 13 to sequentially scan the same. The drum 11 has been shown only one digit position wide, consisting of bit positions 0, 1, 2, 3, 6. It should be understood that the drum contains more than one track used for other purposes. The particular track shown is the output buffer where information from other portions of the machine is finally stored prior to readout to a particular output facility. Dividing the periphery of the drum are three buffers or sectors designated as buffers BFR1 and BFR2 etc. In this particular instance, we will refer only to BFR1 since this is the area used for the output zone used for transferring information to a printer or punch. In BFR1 are a series of words 0 to 16. These words are numbered W0 through W16 and appear sequentially in this order at the read-write heads 13. Each word consists of ten digits for information, one digit for sign, and another digit for timing.

Shown below are the data positions of the drum as they appear sequentially to the read-write heads 13:

| Data position | DX | DS | D9 | D8 | D7 | D6 | D5 | D4 | D3 | D2 | D1 | D0 |
|---|---|---|---|---|---|---|---|---|---|---|---|---|

As the words are read from the drum 11, they are passed through a translator 15 which translates the coded digits into an output pulse, if a card as shown at 17 is positioned at a row at which a punch should be made for that particular coded digit then sensed. In order to illustrate this more fully, a selected list of characters is shown as follows:

| Char. | Dec. | | Output Buff. Tens Bits | | | | | Output Buff. Units Bits | | | | | Punched Hole |
|---|---|---|---|---|---|---|---|---|---|---|---|---|---|
| | T | U | 0 | 1 | 2 | 3 | 6 | 0 | 1 | 2 | 3 | 6 | |
| A | 6 | 1 | 0 | --- | --- | --- | 6 | 0 | 1 | --- | --- | --- | 12/1 |
| B | 6 | 2 | 0 | --- | --- | --- | 6 | 0 | --- | 2 | --- | --- | 12/2 |
| K | 7 | 2 | --- | 1 | --- | --- | 6 | 0 | --- | 2 | --- | --- | 11/2 |
| L | 7 | 3 | --- | 1 | --- | --- | 6 | 0 | --- | --- | 3 | --- | 11/3 |
| S | 8 | 2 | --- | --- | 2 | --- | 6 | 0 | --- | 2 | --- | --- | 0/2 |
| T | 8 | 3 | --- | --- | 2 | --- | 6 | 0 | --- | --- | 3 | --- | 0/3 |
| 0 | 9 | 0 | --- | --- | --- | 3 | 6 | --- | 1 | 2 | --- | --- | 0 |
| 1 | 9 | 1 | --- | --- | --- | 3 | 6 | 0 | 1 | --- | --- | --- | 1 |
| 2 | 9 | 2 | --- | --- | --- | 3 | 6 | 0 | --- | 2 | --- | --- | 2 |
| 3 | 9 | 3 | --- | --- | --- | 3 | 6 | 0 | --- | --- | 3 | --- | 3 |
| 4 | 9 | 4 | --- | --- | --- | 3 | 6 | --- | 1 | --- | 3 | --- | 4 |
| 5 | 9 | 5 | --- | --- | --- | 3 | 6 | --- | --- | 2 | 3 | --- | 5 |
| 6 | 9 | 6 | --- | --- | --- | 3 | 6 | 0 | --- | --- | --- | 6 | 6 |
| 7 | 9 | 7 | --- | --- | --- | 3 | 6 | --- | 1 | --- | --- | 6 | 7 |
| 8 | 9 | 8 | --- | --- | --- | 3 | 6 | --- | --- | 2 | --- | 6 | 8 |
| 9 | 9 | 9 | --- | --- | --- | 3 | 6 | --- | --- | --- | 3 | 6 | 9 |

The characters have been shown in alphanumeric form which is the form used when there are both numeric and alphabetic or special characters in a word. Each character on the drum will then occupy two digit positions designated as tens and units. The tens position occurs at the odd digit places such as D9, D7, D5, etc., while the units digit occurs at digit positions D8, D6, etc. For a given word then, it is possible to store only five alphanumeric characters.

The hole punches for the card are shown in the last column as a number, or numbers separated by a diagonal which indicates that that hole will be placed in each of these rows of the card. The card is divided into rows 9 through 0, 11, and 12. In this particular apparatus the cards are fed with the 9 edge first so that holes are punched first in the 9 row and then in each succeeding row with the 12th row being the final one to be punched.

The numeric digits shown from 90 to 99 are punched in a row which is the same as the units digit so that 90 or zero would have a punch in row 0, whereas a 95 or 5 would have a punch in row 5. In the numeric words, it is not necessary to use the two digit representation and the numeric digits are stored in each successive digit place for a possible total of ten digits plus sign. A numeric word circuit 19 is used to determine whether the data positions of the drum are to be detected as numerics or alphanumerics so that the proper translation and operation of the synchronizing arrangement can be made. This will be described more particularly later.

The translator 15, therefore, translates the numeric characters or alphanumeric characters into an output when a row of the card then being punched forms one punched hole bit for that character. In other words, if the letter or numeric is to be transferred into two punches, such as a 12 and a 9, and we are then reading the 9 row, the punch will be actuated as the card is moved through the punching station to punch a hole in that particular column of the card for which that digit on the drum is designated. At a later time when the character is again sensed on the drum and the translator determines that all 12's will be read out at that time, the characters containing a 12 in the card code such as A, B, etc., will provide an output to indicate that a hole should be punched in that particular column for that particular row. This type of translator is shown in U.S. Patent No. 2,798,554.

The cards 17 are moved, as mentioned previously, 9 edge first by means of a series of drive rolls 21 through a punching station 23 consisting of punches 24 and dies 25. For the 80 columns in a standard card 17, there will be 80 elements 24 to provide a hole at any character position. These character positions are numbered along the long edge of the card. Shown associated with the feed rolls 21 are a series of cams 27, 29, and 31 used to furnish pulses at predetermined times to indicate the time for reading from the drum to the punching station 23 or for other selected functions to be described later. The position of the cams is not intended to be accurate but merely to illustrate a function. Also connected to the driving rolls is an emitter, FIG. 3 (not shown in FIG. 2), to be described subsequently which indicates to the synchonizer or readout arrangement the hole to be punched in the card. Since it is necessary to know or have this information available in the form of electrical pulses, this emitter is stepped along sequentially to indicate to the machine the row then being punched.

A word size buffer 35 is controlled at each word time of the output buffer of drum 11 to control a ring control 37 to generate at the proper time for scanning, a predetermined number of pulses. The word size buffer 35 is used to determine the digits for each word on the output buffer of drum 11 which will be sequentially passed to the punching station 23. The number of words scanned on the drum buffer can be unlimited; however, it is necessary that no more digits be read from the drum than there are punches 24.

The pulses from the ring control 37 are furnished to a units ring control 39 and a tens ring control 41 and subsequently to a units ring 43 and a tens ring 45. These tens and units, which are referred to here, are the positions of the punches 24 from 1 to 80.

The tens ring 45 selectively operates on the tens AND circuits 49 to selectively gate to a plurality of output lines 51, 53, etc., and to groups of AND circuits shown as units, such as 55 and 57, which are selected individually by the units ring 43.

In operation the tens ring 49 selects the units ring 55, 57, etc., which in turn selects a particular line 61, 63, etc. of which only two have been shown of the possible 80, through which the information from translator 15 will be gated to the punch elements 24 for actuation thereby.

Summarizing the operation then, it can be seen that a tens ring control 41 and a units ring control 39 control the selection of the 80 lines, 61, 63, etc., to the 80 punch magnets 24. This is achieved by stepping the output, 61, 63 sequentially in response to the pulses which originate from the ring control 37 in dependence on the output of the word size buffer 35. The buffer 35 also synchronizes the readout from the drum 11 and determines the digit places from each of the words stored in the output buffer which will be brought to the translator 15.

Figure 3:
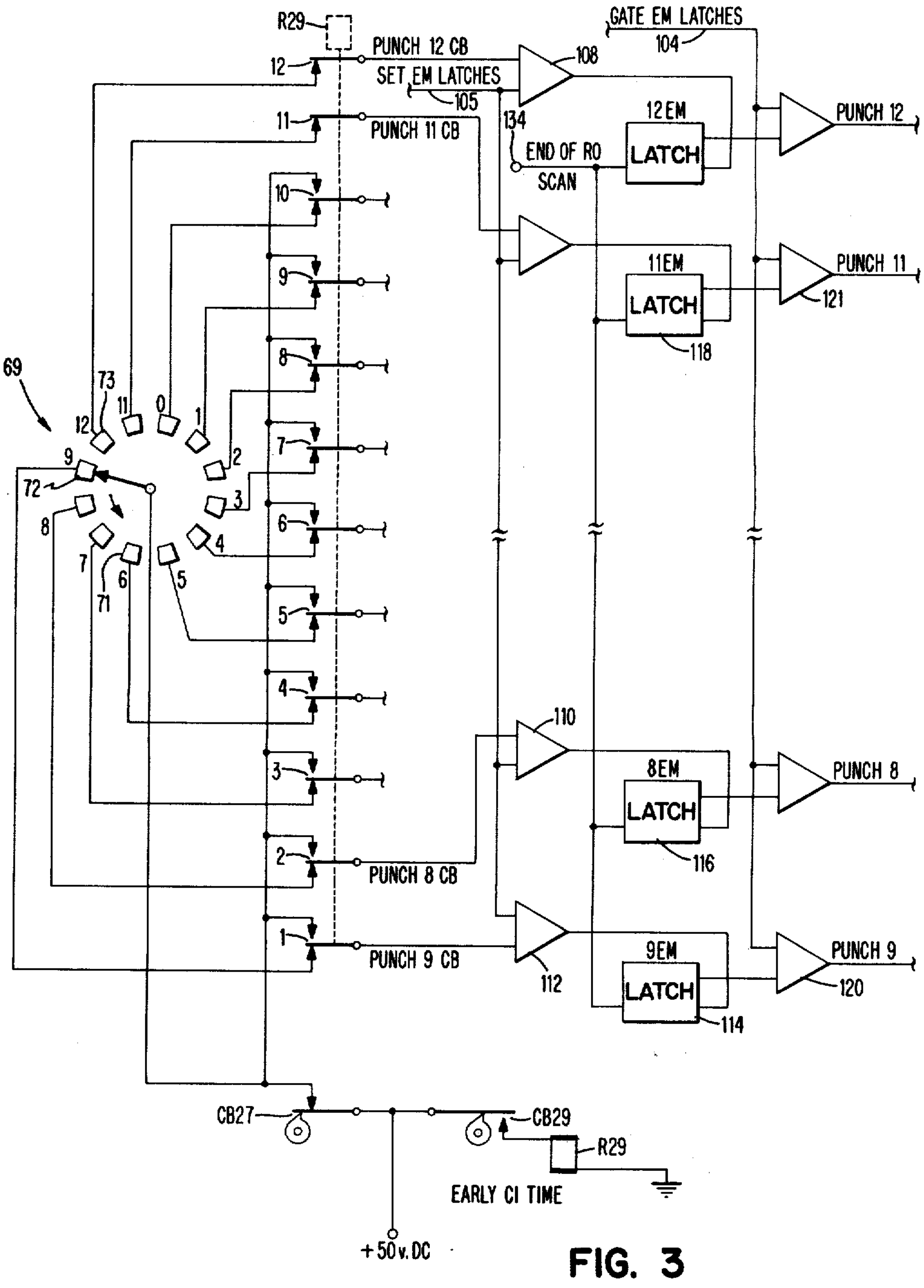
FIG. 3 is a schematic illustration of an emitter and a circuit diagram of a portion of the present invention.

The emitter 69, FIG. 3, referred to in reference to FIG. 1 but not shown, is synchronized with the movement of the card through the punch station 23 to generate a discrete output pulse for each row of the card. A brush 70, as it rotates, will make contact to each fixed contact 71, 72, 73, etc. Supply potential through a circuit breaker CB27 will be supplied through these fixed contacts to the AND circuits 108, 110, 112, etc. The circuit breaker CB27 closes once for each row of the card.

Between the fixed contact 73, indicative of row 12, and thus the last portion of the card, and the fixed contact 72, indicative of row 9 and thus the beginning of the next card, there is a time lapse equal to four of the time periods between the other contacts. Prior to the beginning of 9 time, a circuit breaker CB29, see also FIG. 1, closes to furnish potential to a relay R29 to operate the same and transfer the contacts R29–12 through R29–1, as shown. At the same time, since the circuit breaker CB27 closes periodically, potential is furnished to the transfer contacts of this relay to energize all AND circuits 110, 112, etc., connected to the numeric row output lines 1–10.

The output of AND circuits 110, 112, etc., is gated by an input 105 to set the particular latch or latches 114, 116, 118, etc., corresponding to the row then being sensed. The output of the latch is in turn gated through AND circuits 120, 121 by an input 104, from FIG. 2*c*.

The information stored in the readout buffer of the magnetic drum 11 is available for readout under control of the output facility. At each row time the readout device controls the initiation of the scanning of information from this portion of the buffer by means of 12 readout cams (not shown) which close to provide a pulse to a latch 101, FIG. 2*c*, to set the same for each row. When set, the right-hand side of the latch goes up and operates a single shot 102 to generate a pulse on output 104 and 105. The output of the single shot 102 is further coupled to a series of latches 106 to reset the same to zero. These latches 106 will be discussed subsequently.

The output 105 is provided to the AND circuit 108 to 110, etc., FIG. 3, to provide an enabling signal to set the emitter latches 114, 116, 118, etc. When set, an emitter latch such as 114 will provide a raised output to an AND circuit such as 120 to indicate that row 9 is then being punched.

Figure 2A:
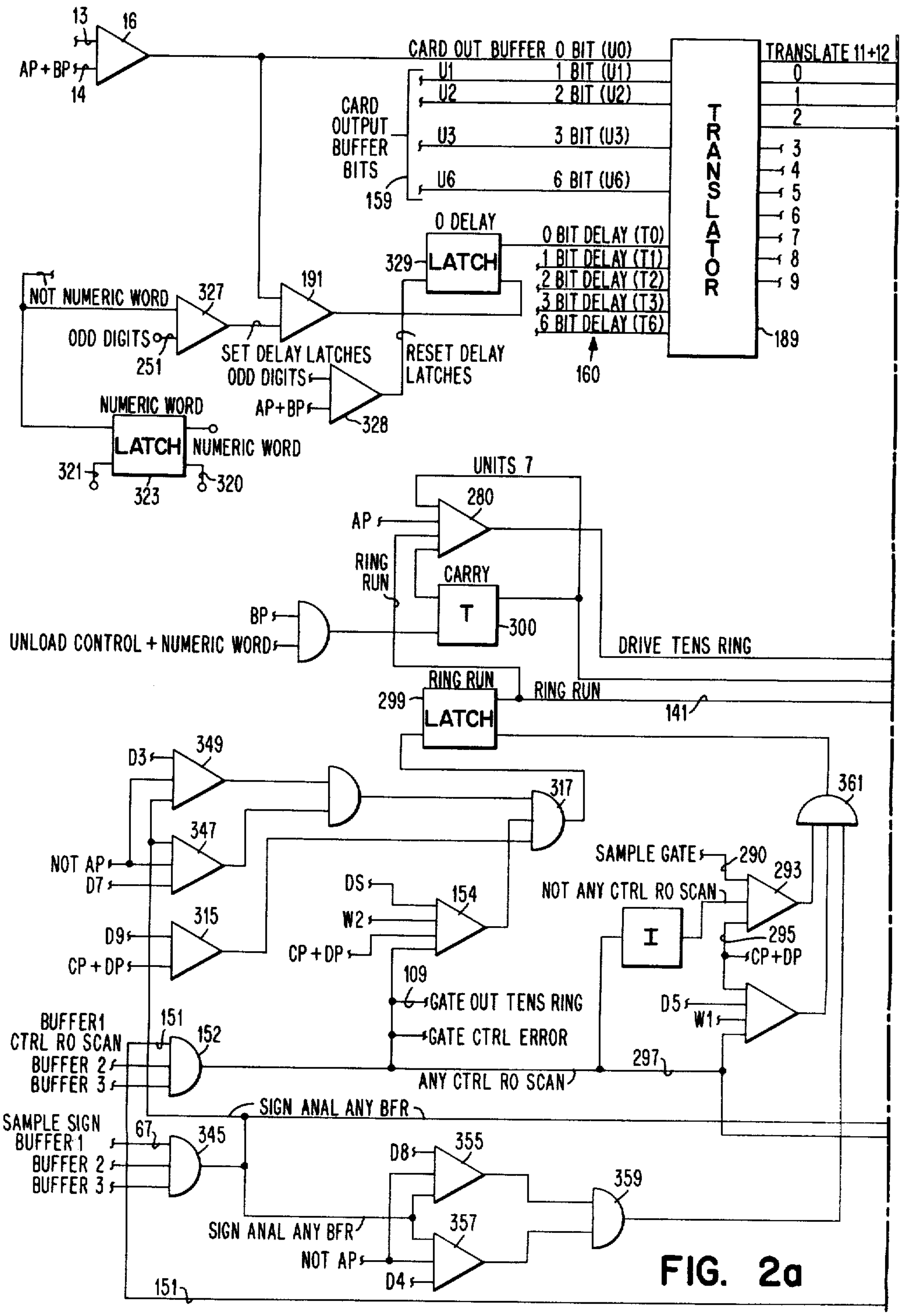
Figure 2B:
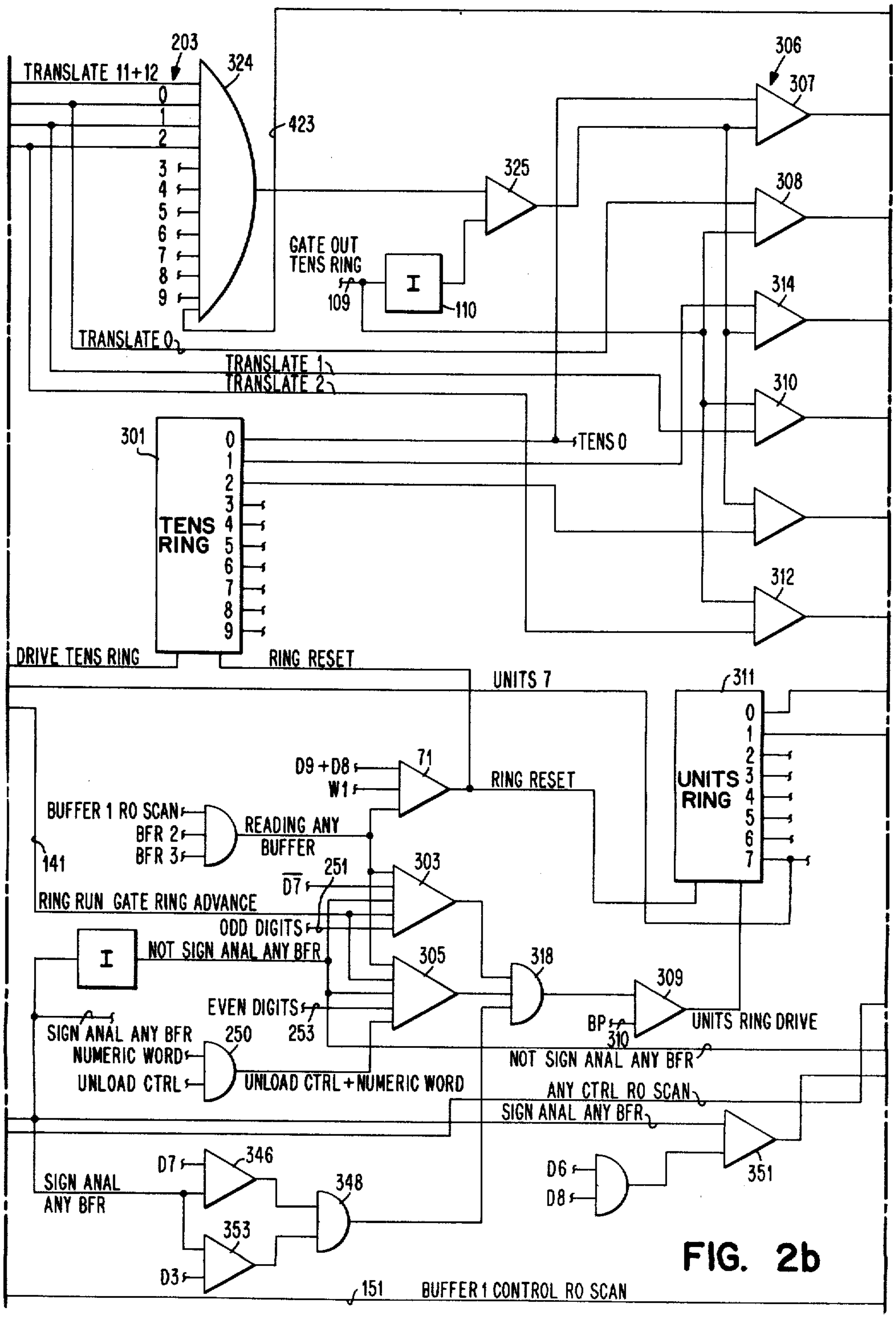
Figure 2C:
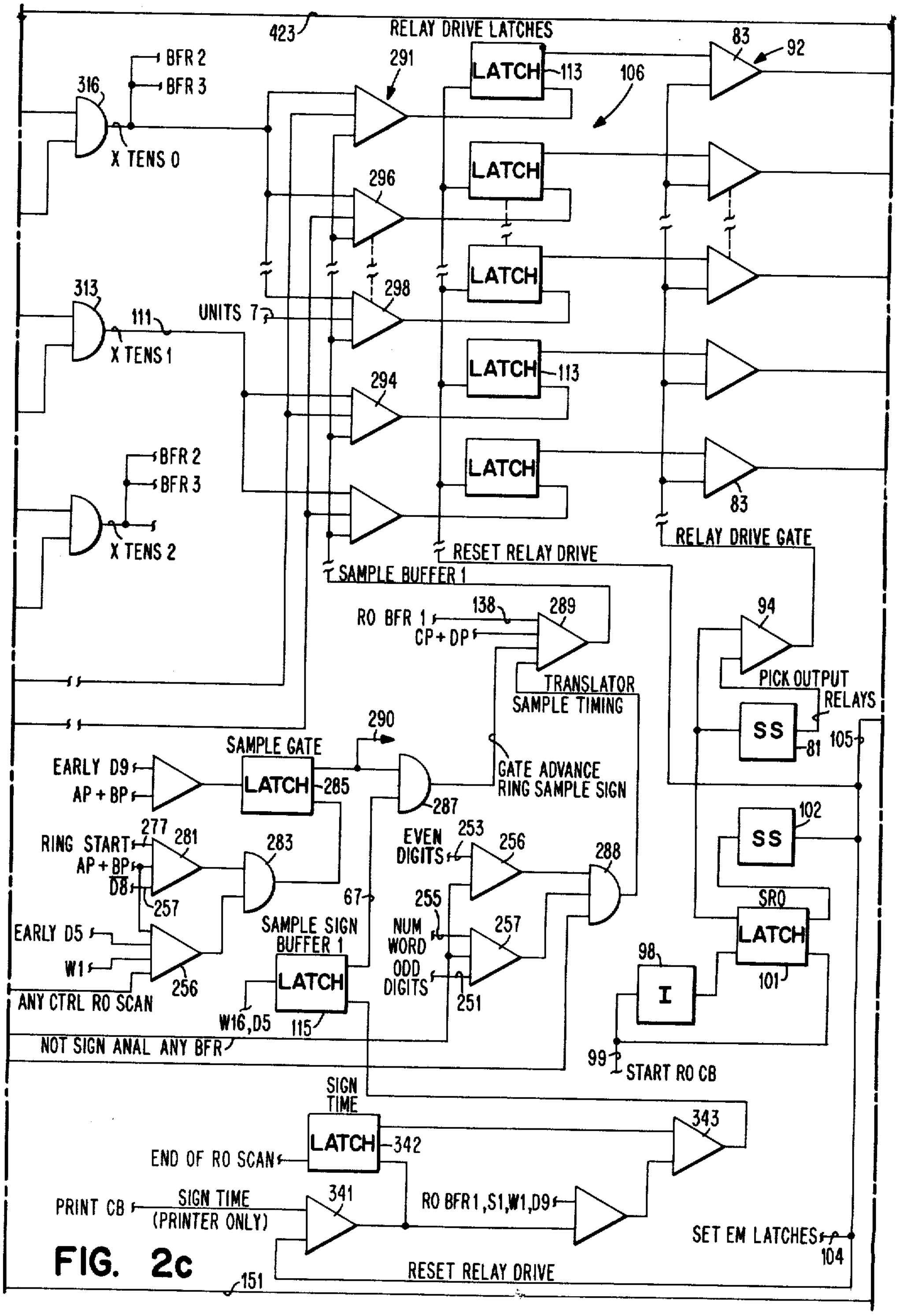
Figure 2D:
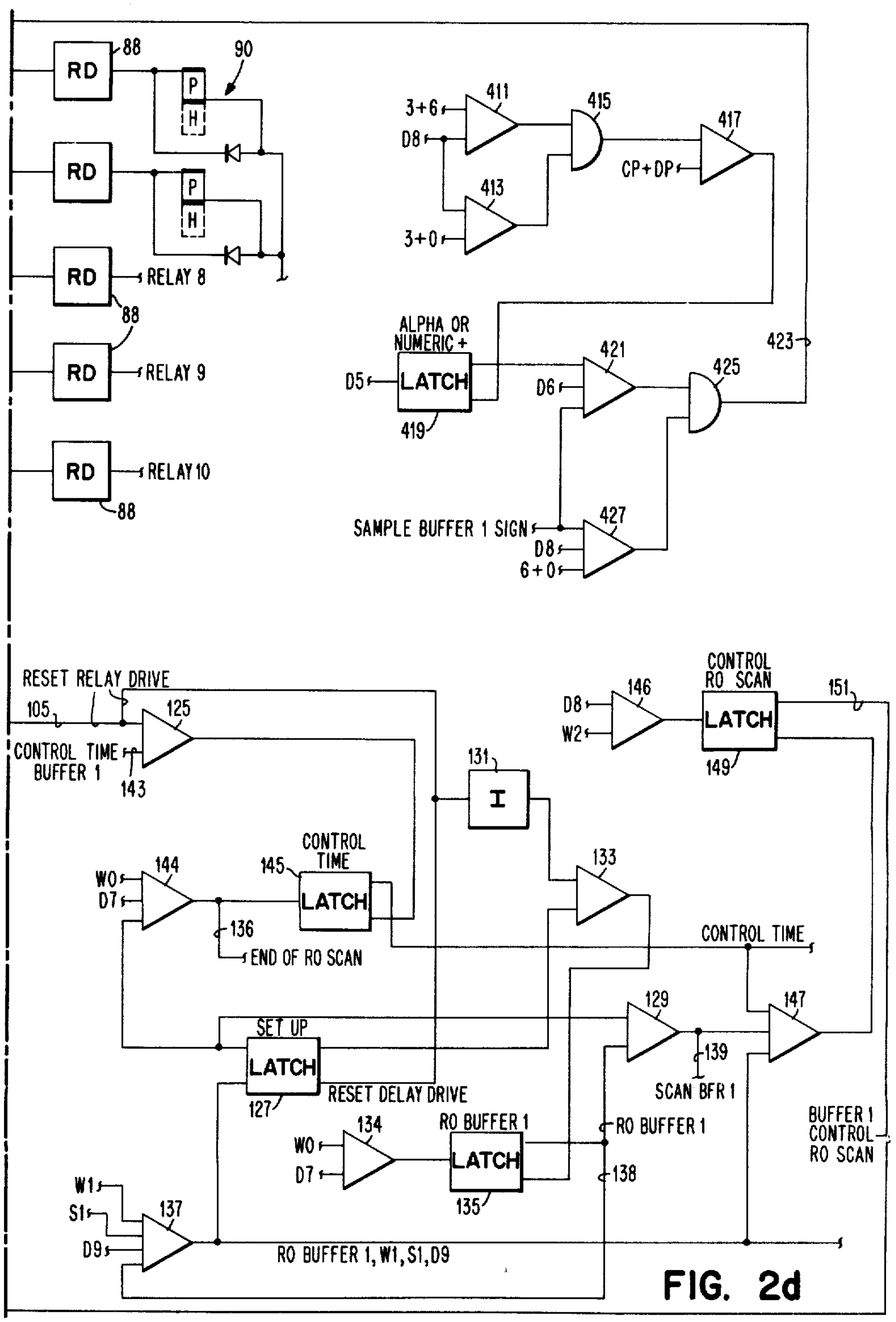

The signal on line 105 is also coupled to an AND circuit 125, FIG. 2*d*, and to a latch 127 to set the same. When set, the latch 127 provides an output signal to the AND circuit 133. After the signal on line 105 terminates, the inverter 131 will supply the proper signal to AND circuit 133 with the output from the setup latch 127 previously set by signal 105 to turn on a readout buffer latch 135.

The output of the readout buffer latch 135 is provided to an AND circuit 129. At word 1 sector 1 digit 9 time of the drum, setup latch 127 is reset by the output of AND circuit 137 to provide a raised output to AND circuit 129 along with the output from readout buffer latch 135. The AND circuit 127 will thus provide a scan buffer signal on output 139 until reset at word 0 digit 7 time by AND gate 134 reset buffer latch 135. The readout of buffer 1 therefore takes place from word 1 sector 1 digit 9 to word 0 digit 7 of the next sector.

A control time input 143, FIG. 2*d*, is gated with the reset relay line 105 through AND circuit 125 to set a control time latch 145. By means of the AND circuit 147 a control readout scan latch 149 is set during the time from word 1 digit 9 to word 2 digit 8 and provides an output 151 to give a control word readout scan. This will be discussed subsequently.

It should be noted here that the timing signals used above and subsequently in describing the operation of the invention are drum timing signals which are not the same as the digit positions of the drum. These drum timing signals occur two digit positions prior to the digit position on the drum with which the apparatus is then concerned. This is illustrated as follows:

| | | | | | | | | | | | | | | |
|---|---|---|---|---|---|---|---|---|---|---|---|---|---|---|
| Data Position | D1 | D0 | DX | DS | D9 | D8 | D7 | D6 | D5 | D4 | D3 | D2 | D1 | D0 |
| Drum Time | DX | DS | D9 | D8 | D7 | D6 | D5 | D4 | D3 | D2 | D1 | D0 | --- | --- |

Figure 4:
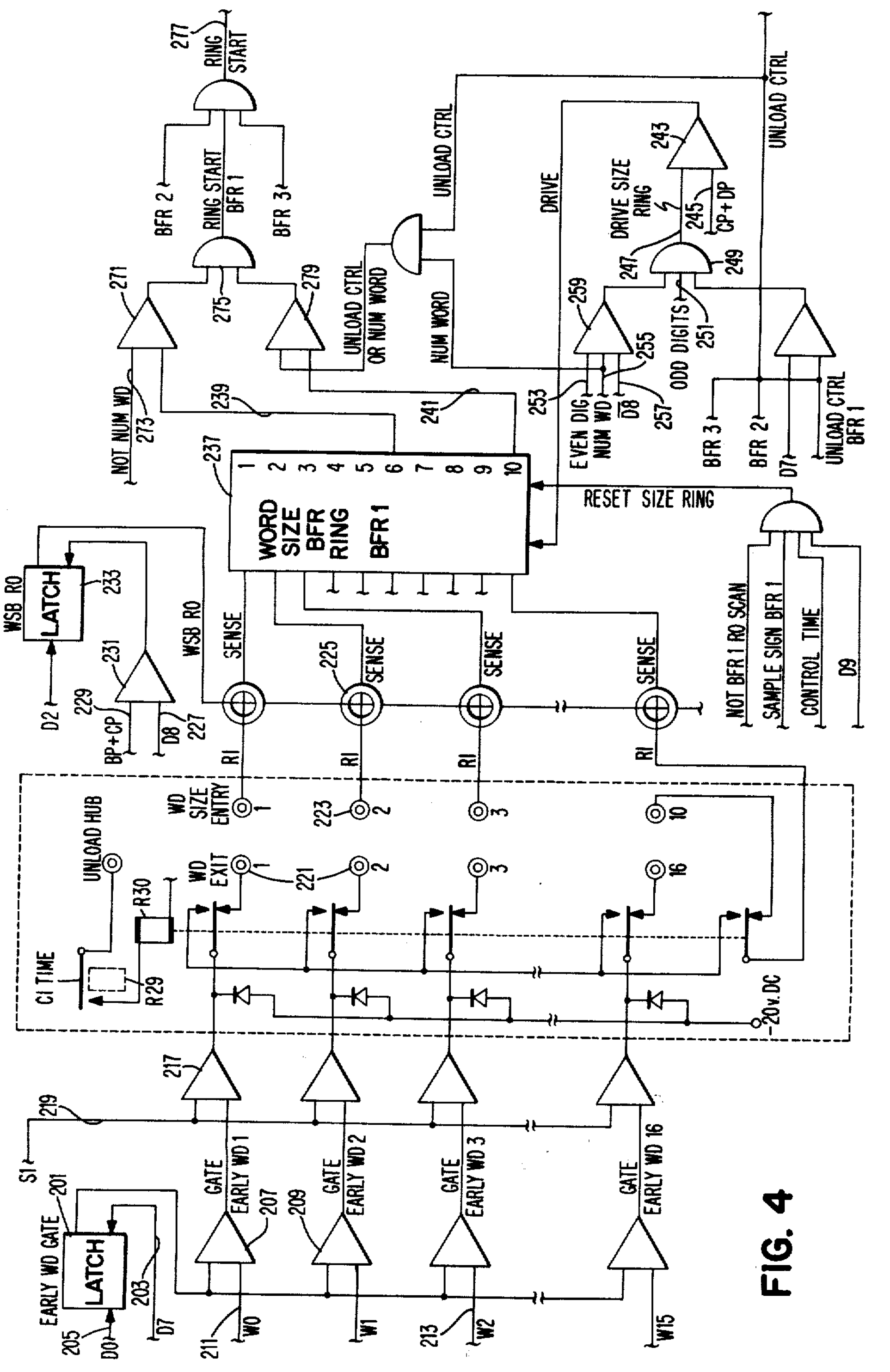
FIG. 4 is a circuit diagram of the apparatus for determining the word size in the present invention.

During the scan buffer signal output 139, FIG. 2*d*, a number of pulses are generated for each word on the drum buffer by the word buffer 35, FIG. 1. These pulses are used to gate particular digit places of a drum word to particular output punch or printing positions. Reference to FIG. 4 shows the drum buffer 35 and ring control 37 of FIG. 1. A latch 201 is turned on at D7 time by an input 203 and turned off at D0 time by an input 205. The output of the latch is supplied to a series of AND circuits 207, 209, etc., which with the word pulses as shown generally at 211 and 213 as W0, W1, W2, W15, etc., provide an early word signal for the next successive word. For example, when W0 pulse, 211, appears, an AND circuit such as 217 is conditioned by a sector 1 pulse on line 219 to provide a pulse at its associated hub 221 indicative that the time has come to make a decision as to how many pulses should be generated for the next successive word on the drum, i.e. word 1. In other words, this is the means for determining how many digits will be read out of a particular word. By plugging hubs 221 selectively to hubs 223, the programmer can select how many digits are to be obtained from each word on the drum. At a particular word time, a pulse will be generated by each of the AND circuits 27 and may selectively be plugged from hub 221 to 223 to set a given core such as 225 to indicate that two digits are to be read in the next succeeding word. The magnetic cores 225 are read out at D8 time by setting a latch 233 with an input AND circuit 231 conditioned by a digit D8 signal and a timing pulse on line 229. The latch 233 is reset at the following digit 2 time of the same word. When the latch 233 is turned on, the cores 225 are returned to their zero state and any core set to a magnetization state of 1 will transfer a pulse to a word size buffer ring 237. It should be noted here that D8 time is digit position DS of the next successive word as explained previously.

The word size buffer ring 237 is a ring circuit consisting of ten stages in which a 1 indication is stepped sequentially from stage to stage to an output. By setting a particular stage, the number of pulses necessary to drive the ring to a runout will be the 10's complement of the stage number. If the time for shifting 10 stages is fixed and if the runout is used as a signal, the time available subsequent to runout but prior to the end of the fixed time will be the number of the stage set therein. For the alphabetic characters to be explained subsequently, this output is 239 or stage 6 while the numeric is stage 10 or output 241. When the core 225 was reset and a pulse was entered into digit position 2 of the word size buffer ring 237, the stepping of the ring started at digit position 2. The driver for the ring 237 is AND circuit 243 which has input timing pulses at 245 and an input at 247. The odd digit timing pulses 1, 3, 5, 7, etc., are provided to an OR circuit 249 at 251. The even digits are provided by AND circuit 259 conditioned by an input 253 with an input signifying a numeric word 255 and no digit 8 on 257. When the buffer ring reaches the 6 position which is an alphanumeric, the AND circuit 271 with the input 273 provides an output through OR circuit 275 to the ring start at 277. At the same time for numeric words, the output 241 from stage 10 to the AND circuit 279 provides the same type of operation. It can be seen, therefore, that the buffer size ring provides an output which is timed to coincide with the digit position of the word from which it is desired to read.

The ring start signal on line 277 is provided to an AND circuit 281, FIG. 2*c*, with a signal on line 257, not D8. The digit 8 pulse (actually DS digit position) is used for sign and therefore is not considered in timing. When the AND circuit 281 provides an output through OR circuit 283, the latch 285 is turned on and furnishes a pulse through OR circuit 287 to the AND circuit 289. The readout buffer 1 signal line 138, from latch 135, FIG. 2*d*, also provides an input to the AND circuit 289. A further input from AND circuit 256 or 257 for the even digits, if alphanumeric, or odd and even digits if the word is numeric, conditions AND circuit 289. The AND circuit 289 thereby provides a signal to condition all the output positions of the drum or printer shown as AND circuits 291.

The output 290 of the sample latch 285 just turned on is coupled to an AND circuit 293, FIG. 2*a*, along with timing pulses on line 295 and the inverted output of the control readout scan on line 151 from FIG. 2*a* to provide an output to a ring run latch 299. The ring run latch output 141 is supplied to two AND circuits 303 and 305, FIG. 2*b*, which couple respectively the odd digit timing signals on line 251 and the even digit timing signals on line 253 to the OR circuit 318. The output of OR circuit 318 is connected to the AND circuit 309 timed by a source of timing pulses 310 to operate the unit ring 311 to successively provide an output from the various stages of the units ring. The output of each stage of the units ring is provided to the corresponding AND circuit in each of a group of 8, such as shown at 291, 294, for two groups.

There are seven stages in the units ring 311 and when the seventh stage is switched off to reset the zero stage, a pulse on line 296 is supplied to an AND circuit 280, FIG. 2*a*. Also connected to AND circuit 280 is the ring run line 141, a timing pulse A*p*, and the output of a carry trigger 300. With this, the AND circuit 298 provides an output to the tens ring 301 to step the same to the next stage.

The selecting of each of the groups of AND circuits 291, 294, etc., is made by the groups of AND circuits 306. In this respect, the zero position of the tens ring is an input to AND circuit 307, the units position of the tens ring is furnished to AND 314, etc. The output pulses from the AND circuits 307, 308, etc., are furnished through OR circuits 316, 313, etc., to condition the inputs of each of the group of AND circuits 291, 294, etc.

Summing up the operation, the units and tens rings 311 and 301 are driven in accordance with the ring start signal 277 obtained from the word size buffer ring, FIG. 4, in response to the start signal read out to the buffer for each cycle point. For each word of the buffer, the proper digits are read out and stored in relay latches 106 as determined by the tens ring 301 and the units ring 311. The ring run latch 299, FIG. 2*a*, is reset by a digit 9 pulse (DX digit position) and a timing pulse applied to AND circuit 315 which provides an output through OR circuit 317. The readout buffer latch 135, FIG. 2*d*, is reset after the sixteen words in storage have been scanned. This reset occurs as mentioned previously at word 0, digit 7 time, immediately following the scan. The word 0, digit 7 and circuit 134 provides a pulse to reset the readout buffer latch 135. The AND circuit 144 conditioned at word 0, digit 7 time provides an output 136 which is applied to the emitter latches, FIG. 3, line 10, to reset the same.

The cam for the next row of the card provides the start pulse to reset readout latch 101, FIG. 2*c*, from the input 99 and initiates the operations previously mentioned. Subsequent to the readout from the drum to the relay driver latches 106, FIG. 2*c*, and after the circuit breaker for a particular row has opened, the input at 99, FIG. 2*c*, will drop and reset the latch 101 by means of the inverter 98. When the latch 101 is reset, a single shot trigger 81 is operated to provide a pulse to AND circuit 94. AND 94 with both inputs up will provide a gate to AND circuits 92 to read the data stored in latches 106 into the relays 90 through drivers 88 to set the same. The relays are used to control the actuation of the dies of the punch and are subsequently reset by means not shown.

The information from the drum 11 appears on line 13, FIG. 2*a*, and is timed by a pulse on line 14 by the AND circuits 16. Only one output is shown from the drum but it should be understood that there would be five AND circuits 16, one for each bit position of a digit. As the drum revolves, the information appears serially by digit at the output of AND circuits 16 and is coupled through to the translator 189 to two sets of inputs 159 and 160. Inputs 159 and 160 are used respectively for the units and tens position of an alpha-numeric character appearing on the drum. If the character is numeric solely, then the input will be furnished only to the units positions 159. If the input is alphanumeric, the numeric word latch 323 will not be set and the AND circuit 327 will be enabled to condition AND circuit 191 which as shown is connected to delay latch 329 of which there are four others to provide the five bits of the code incoming to the translator 189.

A translator 189, not illustrated in detail, is controlled by the emitter of FIG. 3 to effect the translation of a character which appears at the inputs 13 into an output pulse if the card row then punched would form a digit in the card code representative of the character then scanned.

To determine whether a word is numeric or not, sensing circuitry is used to determine the sign of the DS digit of each word. The circuit for sensing digit place DS for each word has been omitted since it is apparent there would be an AND circuit with the proper timing pulse inputs to sense digit position DS with sense lines to detect either a 3 or a 6 which is a plus or a 0 and a 6 which is a minus. Sensing either of these characters in digit position DS a 9 or a 6, will turn on the numeric word latch 323. When this numeric word latch is turned on, the AND circuit 327 will not be enabled and the delay latches 329 of which only one has been shown will not be enabled and we will not sense the even digits for the tens position. It is noted also that the reset for the delay latches 329 is the AND circuit 328 which is conditioned for each odd digit time.

If the word is numeric, the AND circuit 305, FIG. 2*b*, is enabled for each even digit pulse to step the units ring 311. If it is not a numeric word and thus an alphanumeric word, the AND circuit 305 will not be gated and the units ring will be stepped only on odd digit pulses. This allows the same number of alphanumeric characters to be punched in a card as numeric.

A control information time occurs immediately prior to nine time in both the punch and the printer. W1 is designated as the control word and is used to pick selectors etc.

During control information time, W1 is sampled and the digit values present in positions 2 through 9 are brought out to the control panel of the punch-printer. Each digit position has ten digit value exit. For example, if digit 7 has a numeric value of 8, the 8 hub for D7 will become active at the control panel.

The operation during control time is as follows: A control information circuit breaker CB29, FIG. 1 in the printer or punch turns on a control time latch 145, FIG. 2*d*. At the same time a start readout CB, not shown, initiates a buffer scan by setting latch 101, FIG. 2*c*. However, the normal scan is modified by control time. The control time latch 145 combined with the circuitry mentioned previously for the readout will turn on the control readout scan latch 149. This latch remains on for one word until word 2, digit 8 time which is the sign position of the second word. During control information time all emitter outputs 9 through 0, FIG. 3, are active and the corresponding emitter latches are operated by the relay R29 controlled by the cam CB29 so that outputs are provided to the translator to translate all incoming information sequentially as if each card time had occurred. During control time, the tens ring 301, FIG. 2*b*, is disabled by the output of inverter 110 which is conditioned by input 109. The input 109 will, however, condition AND circuits 308, 310, 312, etc. Each of these AND circuits is particular to one of the tens groups of units AND circuits 291, 293 etc. of FIG. 2*c* and data from translator 189 on outputs 0–9 is supplied to the corresponding tens group.

Since a pulse will appear on each output line 0–9, FIG.

2b, for each similar character sensed on the drum 11, the tens group of AND circuits 291, 294 and consequently the corresponding group of relays 88, will store all similar characters. These characters will be stored at the zero position of each tens group. This is because the units ring is standing at position zero. At word 2, digit 8 the control readout scan will be turned off by the AND circuit 146 but the control time latch 145 will not be switched off by AND circuit 144 until the compleiton of that scan at word 0, digit 7.

A sign time occurs only with the printer. It is needed because the printer cannot print signs over the units position. For this reason a special scan must make the signs available to the printer control panels so they may be inserted in the proper positions. Sign time occurs between control information time and 9 time. A special CB in the printer such as 31, FIG. 1, turns on the sign time latch 342, FIG. 2*c*, through an AND circuit 341. However, no emitter latch, FIG. 3, is set at this time. At sector 1, word 1, digit 9 following turn on of the sign time latch 341, the sample sign latch 115 is turned on by the output AND circuit 343 connected to the sample sign latch 115. This provides the means to control the ring advances and samples the buffer at the proper time. The output 67 of the sample sign latch 115, FIG. 2*c*, is coupled through OR circuit 345, FIG. 2*a*, to provide an output, sign analysis any buffer, and is coupled to AND circuits 346 and 348, FIG. 2*b*. An AND circuit 351, FIG. 2*b*, at D6 and D8 time provides an output to AND circuit 289 through OR circuit 288. The D8 sample pulse tests for minus sign, the D6 sample pulse tests for plus sign.

In FIG. 2*d*, AND circuits 411 or 413 are used to test at D8 time for a plus sign. If either provides an output through OR circuit 415 and AND circuit 417 the latch 419 will be set and supply an output to AND circuit 421 which is sampled at D6 to provide an output on line 423 through OR circuit 425 to the OR circuit 324, FIG. 2*b*. If the sign is minus, the AND circuit 427 will provide a signal through OR circuit 425 to output 423 at D8 time.

The drive for the units ring is by means of AND circuits 346 and 353 operative at D7 and D3 time, FIG. 2*b*. The ring run latch 299, FIG. 2*a*, is turned on and off by outputs from AND circuits 347 and 349.

While the invention is described more particularly in relation to a punch, it is apparent that any output facility is equally appropriate to the invention claimed. Further the timing signals shown are available from the drum but have not been shown particularly as to source since their structure is old and well known.

While the invention has been particularly shown and described with reference to a preferred embodiment thereof, it will be understood by those skilled in the art that various changes in form and details may be made therein without departing from the spirit and scope of the invention.

What is claimed is:

1. A data transfer device for serially available data divided into a plurality of words, a series of output devices for storing said data, gating means for each of said output devices, a digit position ring circuit successively advanced for enabling each said output device to accept said data, a word size control operative in response to each said word of data to generate a preselected number of timing pulses, means connecting said word size control and said timing pulses to said digit position ring circuit to successively enable a number of said output devices for each word of data, said word size control includes a static register settable in accordance with the number of pulses desired for each word, a word size ring circuit, means for setting said word size ring circuit in accordance with the digit position set in said static register at the beginning of each word of data, timing pulses for each digit position of said data, an AND circuit connecting said timing pulses to said digit position ring circuit, and means for enabling said timing pulse AND circut when the word size ring circuit reaches the last stage.

2. A data transfer device for serially available data divided into a plurality of words, a series of output devices for storing said data, gating means for each of said output devices, a digit position ring circuit successively advanced for enabling each said output device to accept said data, a word size control including a static register for selecting a predetermined number of timing pulses for each word of data, a word size ring circuit containing a number of stages equal to the maximum number of data characters in a data word, an output from said highest order stage, means for stepping an indication in said ring circuit to said highest order stage in response to each character position of the data, means for setting a stage of said word size ring circuit at the beginning of each word at that position which corresponds to the number set in said static register whereby the word size ring circuit will be stepped for each character position of said data, and means responsive to the output of said highest order stage for enabling a timing pulse source whereby the timing pulses will be provided to said digit position rings for the remaining character position of said word.

3. A data transfer apparatus for a rotating storage medium having words of data characters contained thereon, sensing means for said data, an output medium, a series of output devices operable to generate the same character bits on said medium at successive intervals of time, an emitter for determining the character bit to be generated, a translator connecting said sensing means to said output devices and responsive to said emitter for generating an output pulse for each character bit to be generated contained in each said data character, gating means for each of said output devices, a digit position ring circuit successively advanced for enabling each said output device to accept said data, a word size control operative in response to each said word of data to generate a preselected number of timing pulses, and means connecting said word size control and said timing pulses to said digit position ring circuit to successively enable a number of said output devices for each word of data.

4. The apparatus of claim 3 further including means for providing a control scan of said data on said drum to extract information for controlling said output devices including means at said output device for generating a signal indicative of a control scan operation, means contained in said emitter responsive to said signal for furnishing character bit signals to said translator to translate all data which appears into a pulse for that digit position, and means for transferring the individual character bit signals from said translator to each of a selected series of output devices whereby said control information is available at a plurality of data output positions.

References Cited by the Examiner

UNITED STATES PATENTS

| | | | |
|---|---|---|---|
| 2,702,380 | 2/55 | Brustman | 340—172.5 |
| 2,718,356 | 9/55 | Burrell | 340—172.5 X |
| 2,764,750 | 9/56 | Wright | 340—172.5 |
| 2,798,554 | 7/57 | Smith. | |

MALCOLM A. MORRISON, *Primary Examiner.*

EVERETT R. REYNOLDS, *Examiner.*